US011935505B2

(12) United States Patent
Shaw et al.

(10) Patent No.: US 11,935,505 B2
(45) **Date of Patent: *Mar. 19, 2024**

(54) STRINGED INSTRUMENT RESONANCE SYSTEM

(71) Applicant: Fender Musical Instruments Corporation, Scottsdale, AZ (US)

(72) Inventors: Timothy P. Shaw, Hendersonville, TN (US); Joshua D. Hurst, Nashville, TN (US); Brian C. Swerdfeger, Mission Viejo, CA (US)

(73) Assignee: Fender Musical Instruments Corporation, Scottsdale, AZ (US)

( * ) Notice: Subject to any disclaimer, the term of this patent is extended or adjusted under 35 U.S.C. 154(b) by 554 days.

This patent is subject to a terminal disclaimer.

(21) Appl. No.: 16/981,171

(22) PCT Filed: Feb. 26, 2019

(86) PCT No.: PCT/US2019/019678

§ 371 (c)(1),
(2) Date: Sep. 15, 2020

(87) PCT Pub. No.: WO2019/182731

PCT Pub. Date: Sep. 26, 2019

(65) Prior Publication Data

US 2021/0020152 A1 Jan. 21, 2021

(51) Int. Cl.

*G10D 3/02* (2006.01)
*G10D 1/08* (2006.01)
*G10H 3/18* (2006.01)

(52) U.S. Cl.

CPC ................ *G10D 3/02* (2013.01); *G10D 1/08* (2013.01); *G10D 1/085* (2013.01); *G10H 3/18* (2013.01); *G10H 2210/275* (2013.01)

(58) Field of Classification Search

CPC ...... G10H 3/18; G10H 2210/275; G10D 1/08; G10D 3/02; G10D 1/085

See application file for complete search history.

(56) References Cited

U.S. PATENT DOCUMENTS

| | | | |
|---|---|---|---|
| 2,953,052 | A | 9/1960 | Newton |
| 3,974,730 | A | 8/1976 | Adams, Jr. |
| 5,052,269 | A | 10/1991 | Young, Jr. |
| 5,056,400 | A | 10/1991 | Wachi et al. |
| 5,682,003 | A | 10/1997 | Jarowsky |
| 6,639,134 | B2 | 10/2003 | Schmidt |

(Continued)

FOREIGN PATENT DOCUMENTS

| | | | |
|---|---|---|---|
| CN | 101178892 | A | 5/2008 |
| CN | 106157934 | A | 11/2016 |

(Continued)

*Primary Examiner* — Jianchun Qin

(74) *Attorney, Agent, or Firm* — Robert D. Atkins; PATENT LAW GROUP: Atkins and Associates, P.C.

(57) ABSTRACT

A stringed instrument, such as a semi-acoustic electric guitar, can employ a resonance system that consists of a body having at least one internal cavity accessed by a soundhole continuously extending from a top cover. The soundhole may have a continuously curvilinear transition from the top cover and a length corresponding with an altered resonance frequency of the instrument body.

20 Claims, 5 Drawing Sheets

(56) References Cited

U.S. PATENT DOCUMENTS

| | | | |
|---|---|---|---|
| 6,800,797 B2 | 10/2004 | Steiger, III | |
| 7,151,216 B1 | 12/2006 | Hutmacher | |
| 7,514,615 B2 | 4/2009 | Ribbecke | |
| 8,534,304 B1 | 9/2013 | Tung | |
| 8,710,337 B1 | 4/2014 | Gomes | |
| 8,731,224 B2 | 5/2014 | Shiozawa et al. | |
| 2004/0244566 A1 | 12/2004 | Steiger | |
| 2006/0054001 A1* | 3/2006 | Schmidt | G10D 3/02 84/294 |
| 2008/0105101 A1 | 5/2008 | Eldring | |
| 2008/0110318 A1 | 5/2008 | Fox | |
| 2011/0005366 A1 | 1/2011 | Gillett | |
| 2012/0260787 A1 | 10/2012 | Nash et al. | |
| 2013/0276621 A1* | 10/2013 | Bekerman | G10H 3/181 84/723 |
| 2017/0110997 A1 | 4/2017 | Krucinski et al. | |

FOREIGN PATENT DOCUMENTS

| | | | |
|---|---|---|---|
| JP | 2016166989 A | 9/2016 | |
| KR | 2005-0050722 A | 6/2005 | |
| KR | 20120000358 U | 11/2012 | |
| WO | WO-2017154662 A1 * | 9/2017 | G10D 1/08 |

* cited by examiner

STRINGED INSTRUMENT RESONANCE SYSTEM

FIELD OF THE INVENTION

The present disclosure generally relates to a resonance system for a stringed instrument that can optimize the acoustic properties of an irregularly shaped instrument body.

BACKGROUND OF THE INVENTION

A stringed instrument has been tied to a particular tonality and resonant frequency range based on the size and shape of the instrument's body. Instrument bodies with symmetric shapes, relatively large internal volumes, and/or relatively light physical bracing can have robust frequency ranges with clear tone. For example, a violin, cello, and acoustic guitar each employ relatively large internal volumes that are utilized to provide smooth and clear reproduction of a range of different frequencies.

While such stringed instruments can provide tonal quality, acoustic amplitude and volume can be difficult unless the instrument is played in a location with optimal acoustic properties, such as a concert hall. The use of acoustic transducers can allow sounds produced from a stringed instrument to be amplified, manipulated, and recorded, but often with acoustic degradation due to the limitations of the acoustic transducer and the transducer location on the instrument.

In contrast to stringed instruments that are acoustic in nature, an instrument can be configured to optimize acoustic transducer placement and performance with respect to vibrating strings. Such electric stringed instruments can accurately reproduce relatively large frequency ranges and easily add signal manipulations, such as tone and volume, when plugged into a signal processor. However, an electric stringed instrument can have limited acoustic properties due, at least in part, to priority placement of acoustic transducer(s) and extensive physical bracing that presents an irregularly shaped internal cavity with limited volume.

SUMMARY OF THE INVENTION

A resonance system, in accordance with assorted embodiments, has an instrument body including an internal cavity between a top cover and floor. A sound hole extends from the top cover into the internal cavity. A suspension extends from the instrument body and in contact with the sound hole and further extending along the top cover to suspend the sound hole above the floor of the instrument body.

In another embodiment, a resonance system has an instrument body including an internal cavity, and a sound hole extending from a top cover of the instrument body into the internal cavity. A suspension extends from the instrument body to suspend the sound hole above a floor of the instrument body.

A stringed instrument resonance system, in some embodiments, is utilized by providing an instrument body having a single internal cavity accessed by at least one soundhole continuously extending from a top cover with the soundhole having a continuously curvilinear transition from the top cover and a length corresponding with a first altered resonance frequency of the instrument body. The soundhole is changed to produce a second altered resonance frequency of the instrument body.

DETAILED DESCRIPTION OF THE DRAWINGS

The following various embodiments are directed to a resonance system for a stringed instrument that optimizes frequency response and tonality by changing at least one resonance frequency of the instrument's body. By providing one or more soundholes that reverse the acoustic phase of waves from the inside the instrument's body, an electric stringed instrument can have improved acoustic depth, quality, tonality, and amplitude when not connected to a signal processor. The ability to tune a soundhole of an electric stringed instrument allows a diverse variety of audible frequencies to be optimized despite an irregular shaped internal instrument cavity with relatively small volume.

Figure 1:
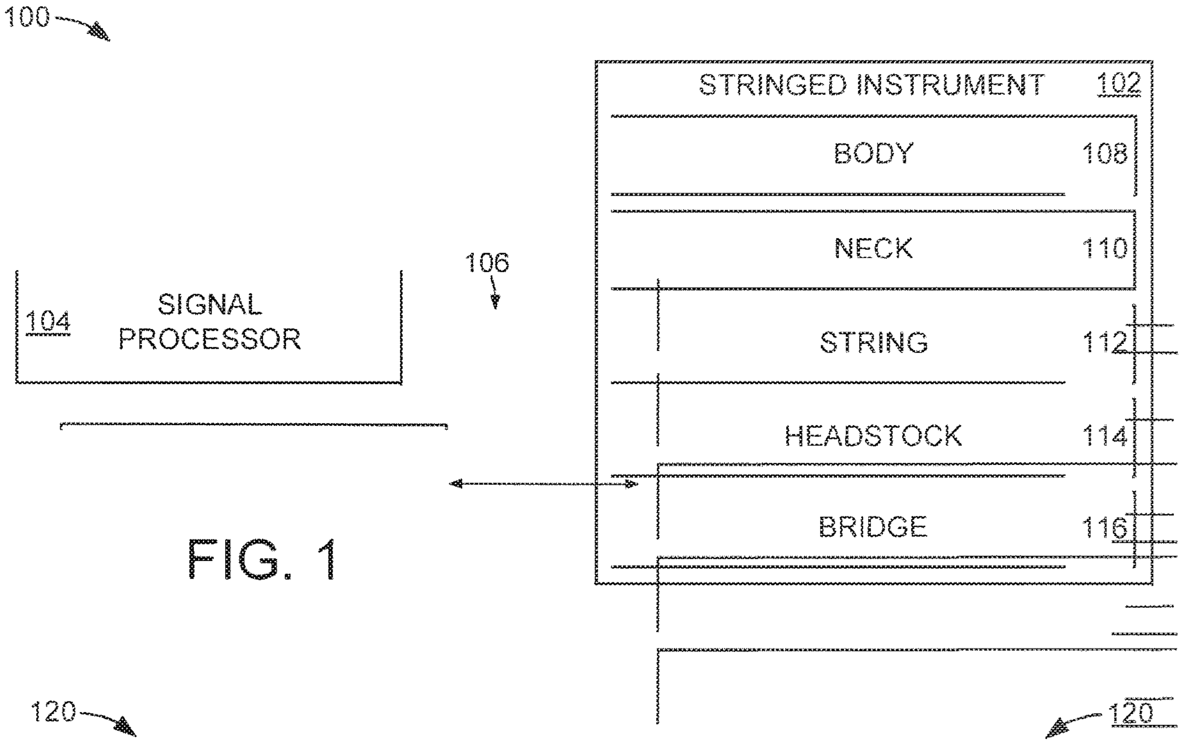
FIG. 1 displays a block representation of an example stringed instrument assembly that may be employed in accordance with various embodiments.

FIG. 1 displays a block representation of an example stringed instrument assembly 100 in which assorted embodiments of the present disclosure can be practiced. The stringed instrument assembly 100 can have any number of stringed instruments 102 that are individually, and/or collectively connected to one or more signal processors 104. As a nonlimiting example, multiple different stringed instruments 102, such as a six-string guitar and a four-string bass, can each be connected to different signal processors 104, such as a foot pedal, while each being connected to a common signal processor 104, such as a sound board, amplifier, or pre-amp, via one or more connections 106, such as a wired and/or wireless signal pathway.

A stringed instrument 102 is not limited to a particular size, shape, type, sound characterization, or material construction, but can in some embodiments be guitar defined at least by a body 108 affixed to a neck 110. One or more strings 112, such as metal, nylon, or other acoustic material, can continuously extend from a headstock 114 to a bridge 116 across the neck 110 and portions of the body 108. Articulation of at least one string 112 produces a predetermined tone and frequency range that can be enhanced by the body 108, signal processor 104, or both. For instance, an acoustic guitar can have no electronic transducing means and rely on the body 108 to reverberate sound generated by the string(s) 112 while an electric guitar can have minimal acoustic chamber in the body 108 and rely on one or more active or passive electronic transducing means, such as a wound coil pickup, humbucking pickup, and piezo pickup.

While an acoustic guitar can be outfitted with electronic transducing means, the string vibration dynamics of a hollow body 108 are different than the solid body 108 often found on electric guitars. Hence, a hollow body electric guitar, which may be characterized as a semi-acoustic guitar, attempts to provide conventional electric guitar string 112 dynamics with acoustic (unplugged) tonality that more closely resembles acoustic guitar sound properties. In yet, modifying an electric guitar to be more similar to an acoustic guitar is much more difficult than modifying an acoustic guitar to be more similar to an electric guitar due to the interior cavity of the body 108 playing such a critical role in producing rich, deep, and smooth acoustic tonality.

Figure 2A:
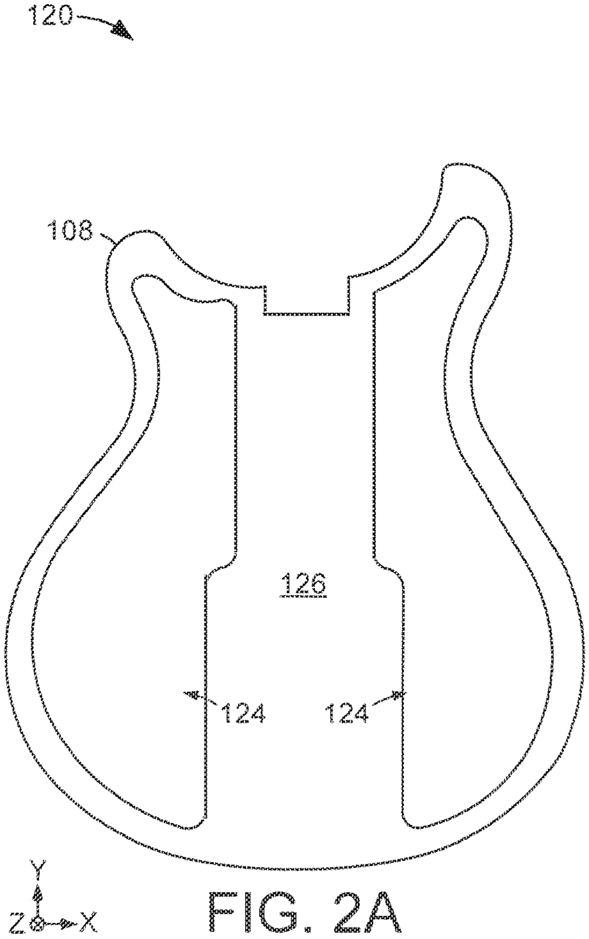
FIGS. 2A & 2B respectively represent portions of an example stringed instrument that may be employed by the stringed instrument assembly of FIG. 1.
Figure 2B:
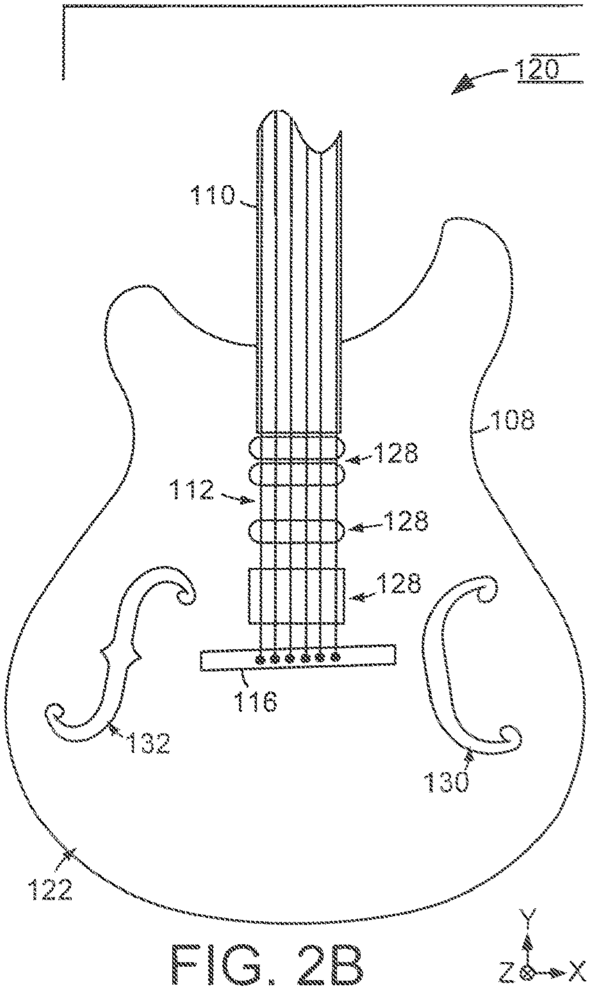

FIGS. 2A and 2B respectively provide line representations of various portions of an example stringed instrument 120 in which assorted embodiments can be employed. FIG. 2A displays a cut-away perspective of a guitar body 108 and neck 110 without a top cover 122 where a bridge 116 is mounted. The body 108 can be any shape, size, and material construction as part of an electric guitar, but is considered a hollow body electric/semi acoustic guitar with a relatively thin profile, such as 1.75" or less along the Z axis, a relatively small internal cavity 124 volume, such as 200 cubic inches or less, and internal features 126 for mounting electronics, such as knobs, batteries, circuitry, and pickups.

It is noted that a solid body electric guitar would differ from the body 108 of FIG. 2A by having no acoustically appreciable internal cavity 124 that enhances the acoustic properties of the vibrating strings 112. In contrast, an acoustic guitar would differ from the body 108 of FIG. 2A by having a larger internal cavity 124 that has a shape conducive to enhancing the acoustic properties of the vibrating strings 112, An acoustic guitar would additionally have physical bracing within the cavity 124 to support a top cover while an electric guitar has ample body structure without bracing to support a top cover 122 and aggressive manipulation of the strings 112.

FIG. 2B displays the stringed instrument 120 fully assembled and ready to play music with the top cover 122 installed and strings tuned to a predetermined tension across one or more pickups 128. To take advantage of the volume of air occupying the internal cavity 124, one or more shaped ports, such as the c hole 130 and/or f hole 132, can allow air to flow into, and out of, the body 108 to enhance and alter the acoustic properties of the vibrating strings 112. That is, sound waves and air translating through the internal cavity 124 from the strings 112 create harmonics at various different frequencies that would otherwise not be produced by the strings alone, but could be detected by a pickup 128 to allow for signal manipulation and playback via one or more signal processors 104.

While the addition of internal cavities and one or more sound ports 130/132 can provide some increased acoustic properties, the irregular shape, as defined as a non-symmetric shape in the X-Y plane, and internal features 126 degrades acoustic performance of the instrument 120. Hence, there is a general interest in optimizing the acoustic performance of stringed instruments with irregular shaped internal cavities, particularly internal cavities with volumes that are too small to provide resonance in the internal cavity at lower frequencies, such as less than 500 Hz.

Figure 3A:
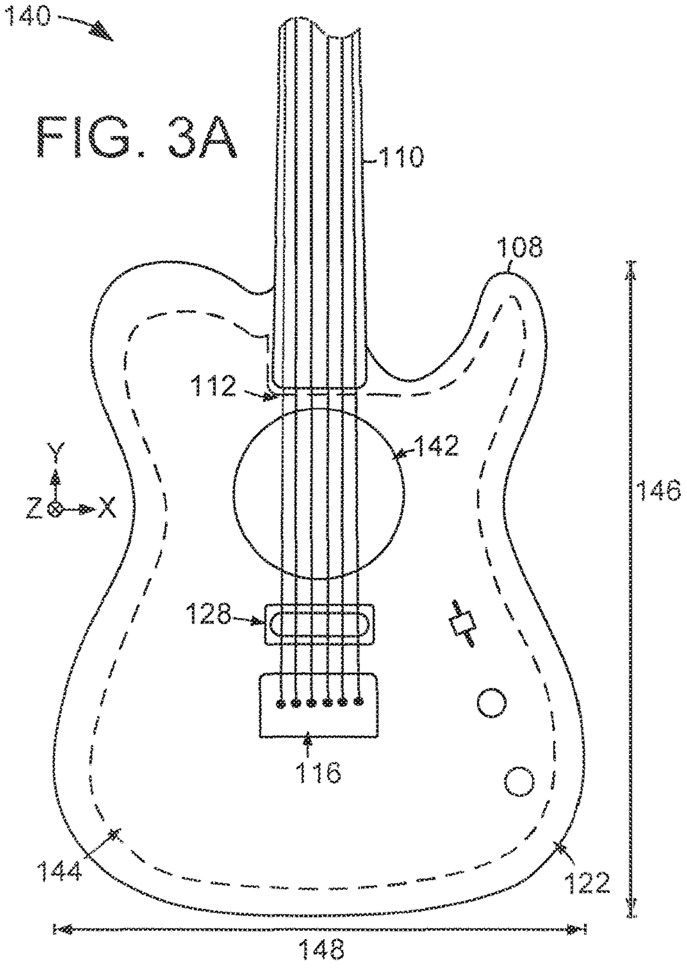
FIGS. 3A-3D respectively depict line representations of portions of an example stringed instrument resonance system configured in accordance with some embodiments.

FIGS. 3A-3D respectively illustrate portions of an example stringed instrument 140 that is configured in accordance with some embodiments to provide optimized acoustic properties in a semi-hollow/hollow body electric guitar. The top view of FIG. 3A shows how the neck 110 extends from the body 108 and supports strings 112, along with a bridge 116, over a soundhole 142 and pickups 128. It is contemplated that the number, type, and location of pickups 128 can be altered, without limitation or detriment to the novel aspects of the present disclosure.

The shape and size of the instrument body 108, particularly the thickness measured parallel to the Z axis, contributes to an irregular shaped internal cavity 124, as shown by segmented region 144. It is noted that the body 108 has a non-limiting length 146 of 16.25" and a non-limiting width 148 of 13.125" at the widest point that allow for a 154 cubic inch volume (+/−5%) of the internal cavity 124. The irregular cavity shape 124 may additionally be influenced by internal features, such as electronic mounting lands and the presence of electronics, to be non-symmetric in the X-Y plane about both the X axis (vertical symmetry) and about the Y axis (horizontal symmetry). Despite the irregular cavity shape, the soundhole 142 provides fluid access to the cavity 124 from directly under the strings 112, which mitigates loss of acoustic waves between the strings 112 and the cavity 124.

Figure 3B:
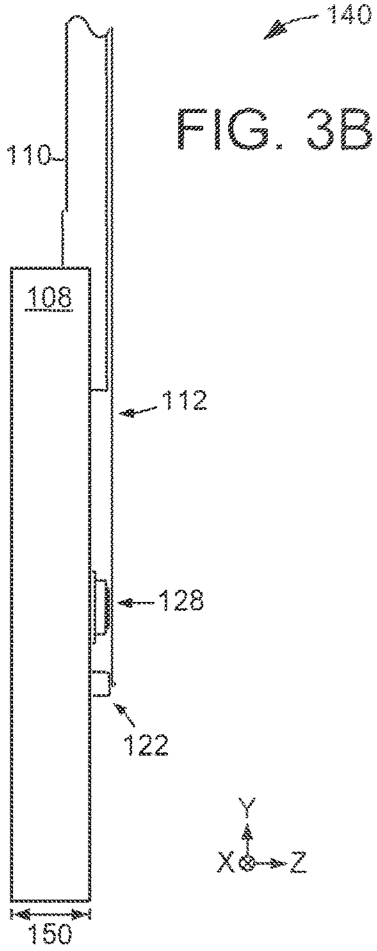

The side profile view of FIG. 3B conveys how the internal cavity is constrained by the relatively thin body 108. That is, a body thickness 150 of less than 2", such as 1.75", prevents the internal cavity 124 from being large enough to naturally resonate frequencies in a low range, such as below 500 Hz. The side view of FIG. 3B further conveys how the top cover 122 is a planar surface parallel to the X-Y plane, which contrasts bowed, rounded, or other curvilinear shapes that have depth along the Z axis. Such planar top cover 122 stresses the ability of the body 108 and bridge 116 to control string vibrations to produce a musically pleasing sound. Thus, the internal cavity 124 is tuned in some embodiments in concert with the soundhole 142 to alter the resonance of the internal cavity 124, and body 108, to optimize the acoustical volume, bass response, and tonality of the instrument 140 when not connected to a signal processor 104.

Figure 3C:
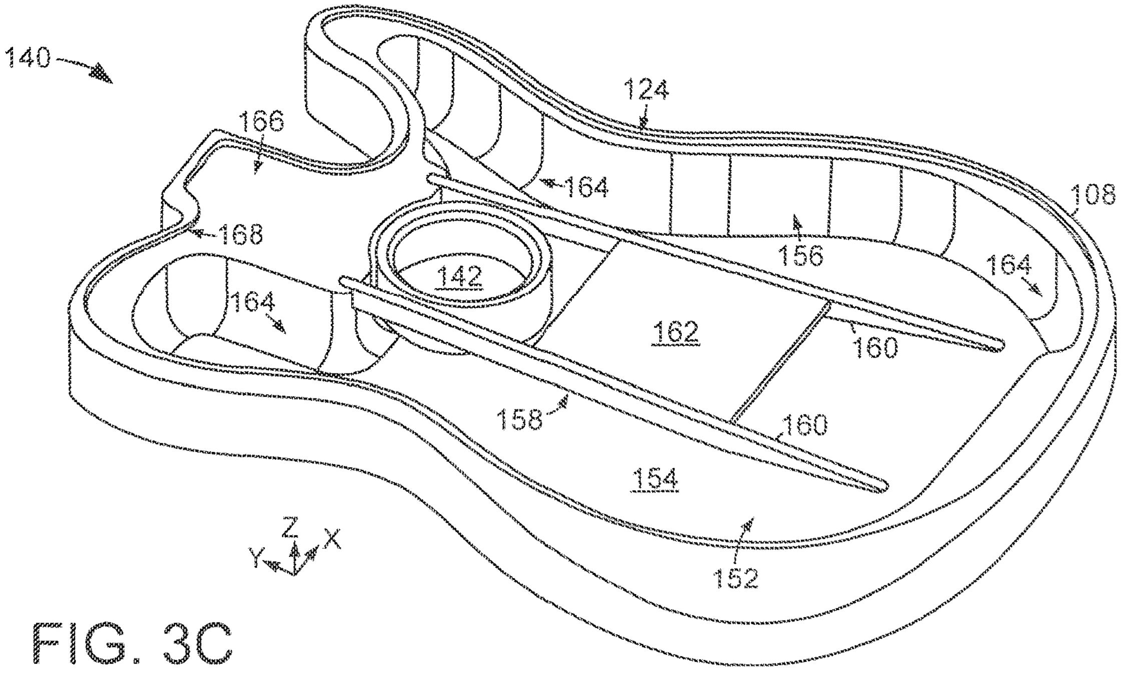

FIG. 3C has the instrument 140 with the top cover 122 removed to show the tuned internal cavity 124 in accordance with assorted embodiments. The inner cavity 124 is configured as a single, continuous chamber 152 with a floor 154 and sidewall 156 extending to maximize the volume of the inner cavity 124. It is noted that a single chamber 152 is not required and any number of physically separate chambers can be positioned in the body 108, beneath the top cover 122. However, a single chamber arrangement can allow for acoustic material(s) to be selectively inserted into the body 108 to influence the acoustic properties of the instrument 140. For instance, one or more materials, such as polyester, other acoustic fabrics, foam, elastomer, and rubber, can be inserted into the chamber 152 to alter the practical volume of the chamber 152 and tune the instrument 140 to a lower, or higher, resonant frequency range.

The perspective of FIG. 3C illustrates a single soundhole 142 is mounted in position above the chamber floor 154 by a suspension 158 that is also partially separated from the floor 154 to promote efficient movement of air, and overall instrument tonality, compared to if the suspension continuously extended to the floor 154 and/or restricted airflow to, and from, the soundhole 142. The suspension 158 has a pair of rails 160 that are each notched into the body 108 to support the soundhole 142 and a bridge deck 162 where strings attach to the body/'top cover.

The airflow within the chamber 152 can be tuned via the structure of the floor 154 and sidewall 156 in a variety of different ways, such as size, shape, and depth, which allows for a diverse range of resonant frequencies for the instrument 140 and frequency reproduction ranges with optimized acoustic properties. In the non-limiting example of FIG. 3C, the floor 154 meets the sidewall 156 with a continuously curvilinear shoulder 164 that promotes laminar, as opposed to turbulent, airflow in response to user articulation of strings of the instrument 140. The configuration of single chamber 152 with a radiused shoulder 164, as shown, can complement increased volumes of air being influence by vibration of string(s) by mitigating flutter, the generation of vacuum in the chamber 152, and eddys that can degrade the transmission of sound waves and the acoustic quality of the instrument 140.

It is contemplated that the suspension 158 can provide some bracing of the top cover, but such bracing is minimal due to the top cover seating into a recess 166 of the body 108. That is, the size, strength, and position of the suspension 158 can be arranged for optimal chamber 152 volume and acoustic properties instead of being arranged for structural support for the top cover due to the top cover having both lateral (in the X-Y plane) and vertical (parallel to the Z axis) support provided by the recess 166. The ability to tune the depth of the recess 166 allows for adjustment of the amount of physical support for the top cover. As such, the amount of flex allowed in the top cover during operation can be tuned for user preference by adjusting the amount of surface area of the top cover contacting the body 108 at the recess sidewall 168.

Figure 3D:
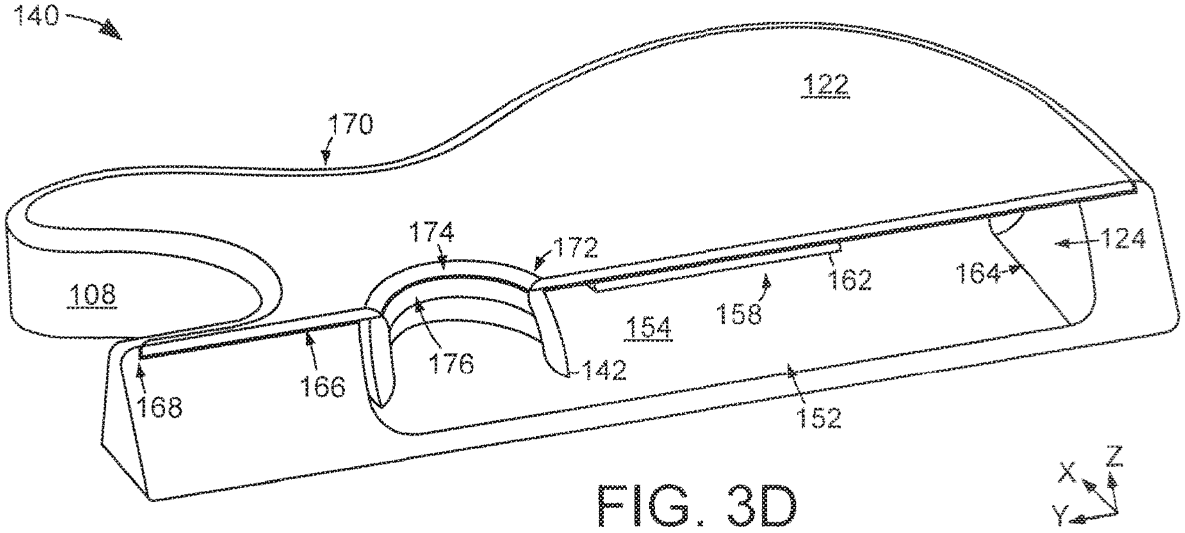

The cross-sectional view of the stringed instrument in FIG. 3D displays how the soundhole 142, suspension 158, and chamber 152 can be arranged relative to the top cover 122. As shown, the top cover 122 continuously extends within the body recess 166 to concurrently physically rest above the soundhole 142 and suspension bridge deck 162 without extending above the edge 170 of the instrument body 108 along the Z axis. The top cover 122 has a sound aperture 172 with centerpoint that is aligned with the soundhole 142 centerpoint along the Z axis.

Although not required or limiting, various embodiments configure the sound aperture 172 with a continuously curvilinear rim 174 that matches the diameter and soundhole rim 176 at a transition region where the top cover 122 meets the soundhole. By shaping the sound aperture 172 to match the soundhole rim 176 with a radiused surface, laminar airflow is promoted that increases the quality of sound waves entering, and exiting, the soundhole 142. In some embodiments, the soundhole 142 continuously extends to a position even with, or above, the top cover 122 along the Z axis, which would convert the curvilinear aperture rim 172 to a joint where the top cover 122 meets the side of the soundhole 142. It is noted that the soundhole 142 has an acoustic profile that corresponds with the structural configuration of the soundhole itself.

Regardless of whether the soundhole 142 extends to a plane above the top cover 122, as defined parallel to the Z axis, the configuration of the soundhole 142 optimizes the sound properties of the instrument 122 by reversing the acoustic phase of sound waves within the chamber 152 to alter at least one resonant frequency, and/or frequency range, of the instrument 140. Hence, the soundhole 142 provides structure along with the single chamber 152 to artificially enhance the acoustic properties of the vibrating strings proximal a ported enclosure. In other words, the soundhole 342 and single chamber 152 result in operational acoustical advantages that would otherwise not be available by positioning a port in an instrument body 108 having an internal cavity volume, which distinguishes the present embodiments from acoustic, hollow body electric, and semi-acoustic guitars.

Figure 4:
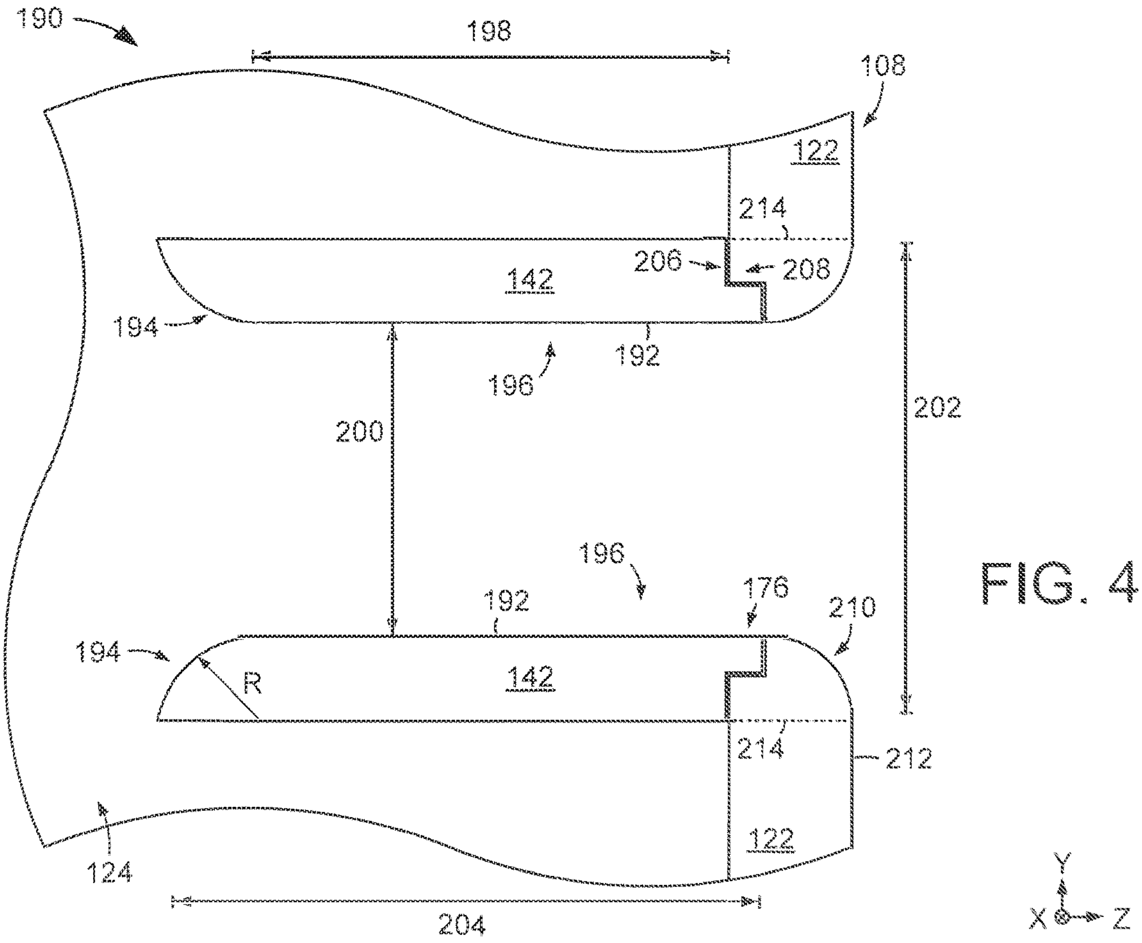
FIG. 4 is a cross-sectional representation of a portion of an example stringed instrument resonance system arranged in accordance with various embodiments.

FIG. 4 depicts a cross-sectional line representation of a portion of an example stringed instrument 190 configured in accordance with various embodiments to exhibit optimized acoustic properties. The soundhole 142 continuously extends from the top cover 122 into one or more internal cavities 124 with a smooth sidewall 192 that defines the acoustic profile of the soundhole 142 with its length, shape, and diameter. In the non-limiting example of FIG. 4, the sidewall 192 has a curvilinear portion 194 and a linear portion 196. The curvilinear portion 194 can be characterized as having a uniform radius (R), such as 0.375" in the Y-Z plane, along with a soundhole shape, such as circular, oval, square, or parallelogram, in the X-Y plane parallel to the top cover 122.

The acoustic profile of the soundhole 142 contacts the linear portion 196 with the curvilinear portion 194 at a predetermined depth 198 within the body 108, as measured parallel to the Z axis from the top of the internal cavity 124, as shown. The linear configuration defines a uniform inner diameter 200 parallel to the X-Y plane while the curvilinear portion 194 defines a variable inner diameter 202 that is no smaller than the uniform inner diameter 200.

The sidewall 192 continuously extends to an overall length 204, as measured parallel to the Z axis, that is selected to ensure sound wave phase reversal in a manner similar to a Helmholtz resonator. That is, the soundhole 142 separates the internal portions of the body 108 from the strings, and outside ambient air, with a length that causes sound waves inside the body 108 to reverse phase within the soundhole 142. It is noted that the soundhole length 204 can be a function of the diameter(s) 200/202 as well as the resonant frequency at which phase reversal is guaranteed. As a result, some acoustic frequencies may not experience phase reversal within the soundhole 142, but all acoustic frequencies within a tuned range will experience phase reversal.

As a non-limiting example, the soundhole 142 may have a length of 1.125", a uniform diameter of 2.375", and a variable diameter of 2.375-2.975". The soundhole 142 may be constructed of any type of material, but in some embodiments is a solid natural wood, such as mahogany, ash, spruce, or cedar, that promotes acoustic richness and/or depth. However, portions of the soundhole 142 are contemplated to be non-wood materials, such as metal, ceramic, polymer. Portions of the soundhole 142 can be coated in a material, such as resin, wax, or filler, that increases the density of underlying material. At least some of the soundhole 142 can be shaped or textured, to promote laminar airflow, such as with dimples, ridges, grooves, or cantilevered protrusions that extend into, or out of, the soundhole diameters 200/202.

While the interior sidewalls of the soundhole 142 can be tuned to optimize airflow and acoustic operation, the exterior of the soundhole 142 may also be tuned. For instance, a portion of the soundhole 142 can be removed via one or more notches 206 that allow the soundhole 142 to fit in a matching cover notch 208. The exterior of the soundhole 142 may be configured to provide physical support for the top cover 122 by physically contacting more of the top cover 122 than the soundhole rim 176, as provided by the notch 206 size and shape. It is noted that the soundhole 142 may be affixed to the top cover 122 with any adhesive, such as glue or epoxy, or may have strictly a friction fitment, such as tongue-in-groove, with no adhesive or artificial affixing means.

As displayed in FIG. 4, the top cover 122 can provide a continuously curvilinear transition region 210 where the exterior top cover surface 212 transitions to the linear portion 196 of the soundhole sidewall 192. The transition region 210 can be tuned to promote laminar fluid flow while guaranteeing acoustic phase reversal, such as by configuring the transition region 210 to match, or be dissimilar to, the downhole curvilinear portion 194. It is contemplated that the transition region 210 is incorporated into the soundhole 142 instead of being part of the top cover 122, which would result in the soundhole 142 continuously extending through the top cover 122, as shown by segmented lines 214.

Figure 5:
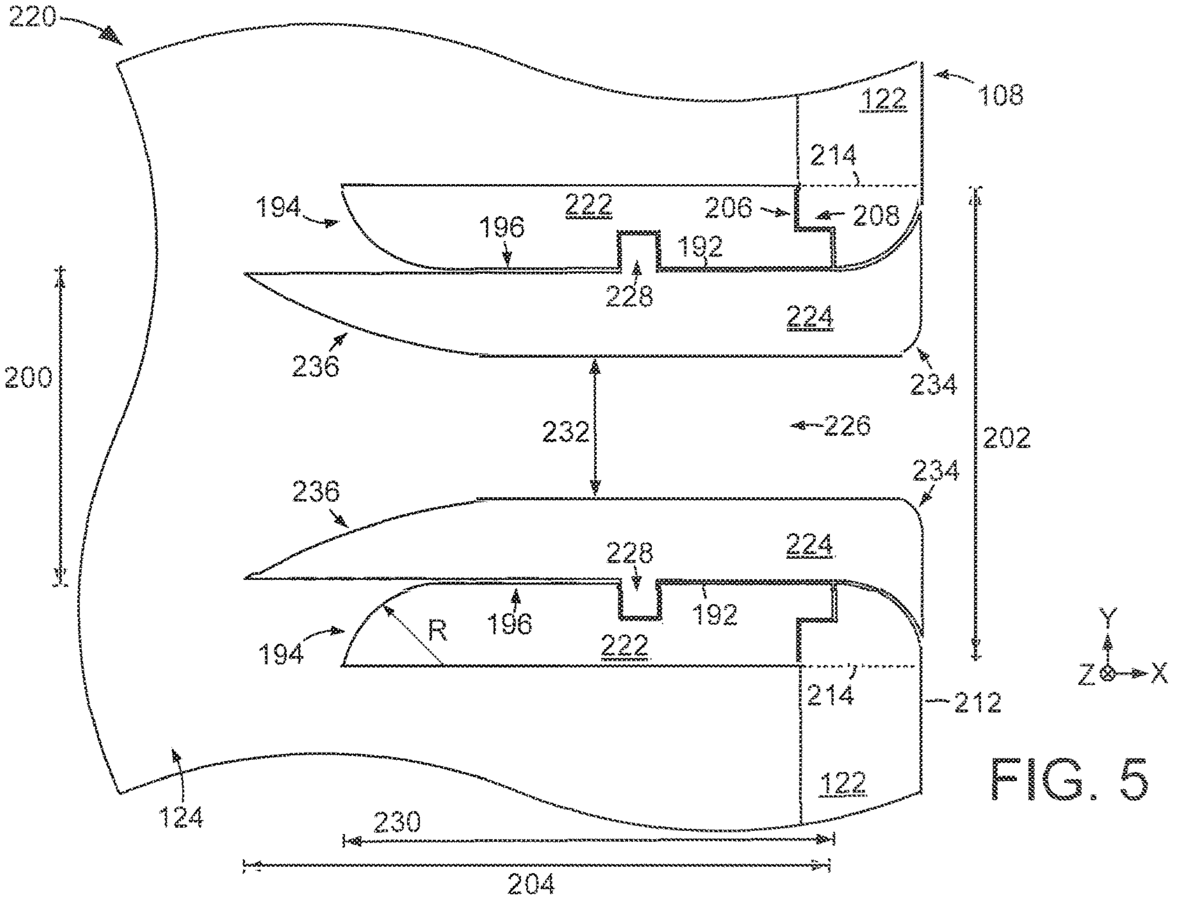
FIG. 5 conveys a cross-sectional representation of a portion of an example stringed instrument resonance system utilized in accordance with assorted embodiments.

The ability to tune the configuration of the soundhole 142 allows some frequencies to be enhanced by raising, or lowering, the resonance frequency of the body 108. In yet, a static tuned configuration of a soundhole 142 may not be desirable to users that want to alter different resonant frequency and/or frequency ranges. Accordingly, various embodiments provide an adjustable soundhole that can be manipulated by a user to change the frequency, and frequency range, in which acoustic phase reversal is guaranteed. FIG. 5 illustrates a cross-sectional line representation of portions of an example stringed instrument 220 employing a variable soundhole 222.

It is contemplated that a soundhole 222 can be arranged to accept one or more inserts 224 that are rigidly attached, such as with at least one fastener or with a friction fit within the soundhole bore 226. Friction fitment may involve accessories, such as a clip, spring, or shim, that increases the surface pressure forced onto the soundhole 222, insert 224, or both. The soundhole 222 may have a structural feature 228, such as a groove, protrusion, aperture, or ridge, that physically engages portions of the insert 224 to prevent unwanted insert 224 movement or vibration. For example, the insert 224 may physically fit within the soundhole 222 and be retained with the aid of a threaded engagement, an accessory applying force, and/or a keyed configuration.

It is noted that the soundhole 222 may operate alone as an acoustic phase reversing feature, similar to the soundhole 142 of FIG. 4, and the insert 224 merely alters the physical configuration of the underlying soundhole 222. As a non-limiting example, the insert 224 may provide a different length 230, diameter 232, sidewall shape, transition region 234 shape, and curvilinear portion 236 shape that results in a different acoustic profile than the underlying soundhole 222, as shown. However, some embodiments construct a single soundhole 222 to be interchangeable by a user so that a first soundhole with a first acoustic profile can be wholly removed and replaced by a second soundhole with a different second acoustic profile. Such a single, interchangeable soundhole 222 can attach to the instrument body 108 in a variety of different manners, such as a keyed joint, buckle, clip, or friction fit, A variable soundhole 222, in some embodiments, is an adjustable assembly constructed as a single unit that can be articulated by a user, such as through rotation of a central member with respect to an outer member and the instrument body 108. The ability to easily and efficiently alter, or replace, a first soundhole 222 that is tuned to change the resonant frequencies in a first range to a second soundhole/insert that is tuned to change the resonant frequencies in a different second range allows the stringed instrument 220 to be more versatile and conducive to different types of music reproduction, such as blues, rock, classical, and jazz.

Figure 6:
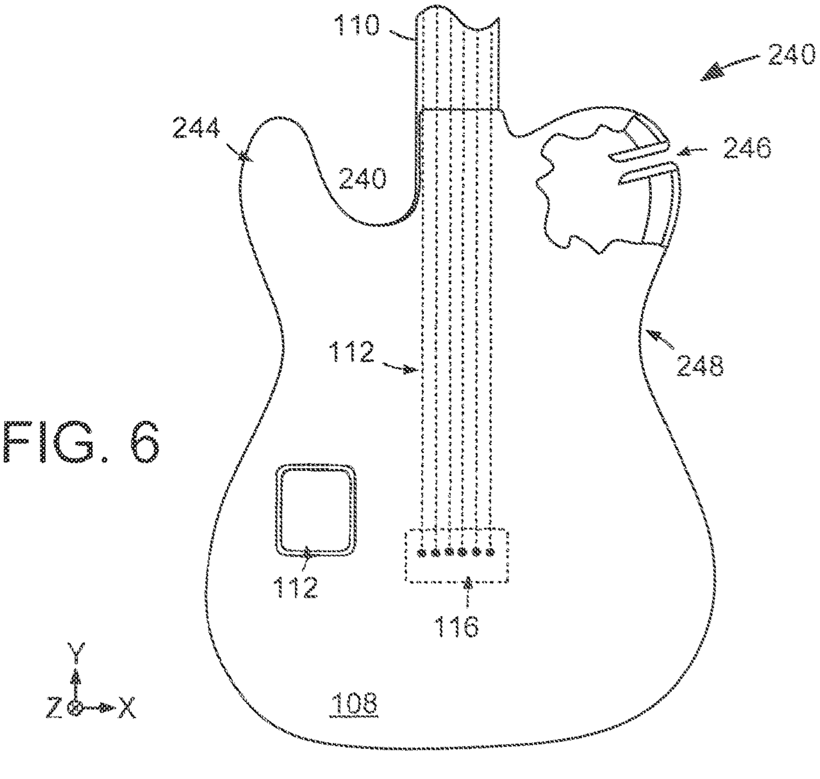
FIG. 6 illustrates a line representation of portions of an example stringed instrument resonance system that may be employed in accordance with various embodiments.

FIG. 6 displays a line representation of portions of another example stringed instrument 240 constructed and operated in accordance with various embodiments. The stringed instrument 240 is shown from a rear perspective in FIG. 6 and has a body 108 affixed to a neck 110 with strings 112 suspended from a bridge 116 towards a headstock, as conveyed in segmented lines.

While some embodiments position a soundhole directly under the strings 112, as shown in FIG. 3A, other embodiments position one or more soundholes away from the strings 112 on the body 108. For instance, a first soundhole 242 can be located on a rear surface 244 of the body 108 and a second soundhole 246 is positioned on a side surface 248 of the body 108, as illustrated in a cutaway portion of the body 108. Each soundhole 242/246 is offset from the strings 112 as well as from the top cover of the body 108 in such a non-limiting example, the first soundhole 242 can be tuned with different acoustic profiles, such as with a different physical size, shape, and sidewall profile, than the second soundhole 246. In yet, various embodiments arrange the soundholes 242/246 to have matching acoustic profiles.

A soundhole 242/246 can be arranged to be covered, and potentially sealed, by a plate, grill, or other material, which allows a user to alter the acoustic behavior of the instrument 240 at will. It is contemplated that soundholes 242 and/or 246 can complement a string-aligned soundhole on the top cover of the body 108 but such configuration is not required or limiting. The use of multiple soundholes 242/246 can correspond with a single port for each separate chamber internal to the body 108 to prevent an excess of airflow from any single internal chamber that can degrade acoustic quality of the instrument 240.

The ability to selectively open, and close multiple soundholes in a single instalment body 108 allows the instrument 240 to be widely adaptable to enhancing different resonant frequencies, and frequency ranges. Such multiple soundhole configuration can be an alternative to the soundhole insert 224 or variable soundhole assembly that allows a user to direct sound waves in different directions that outward from the top cover of the body 108.

Figure 7:
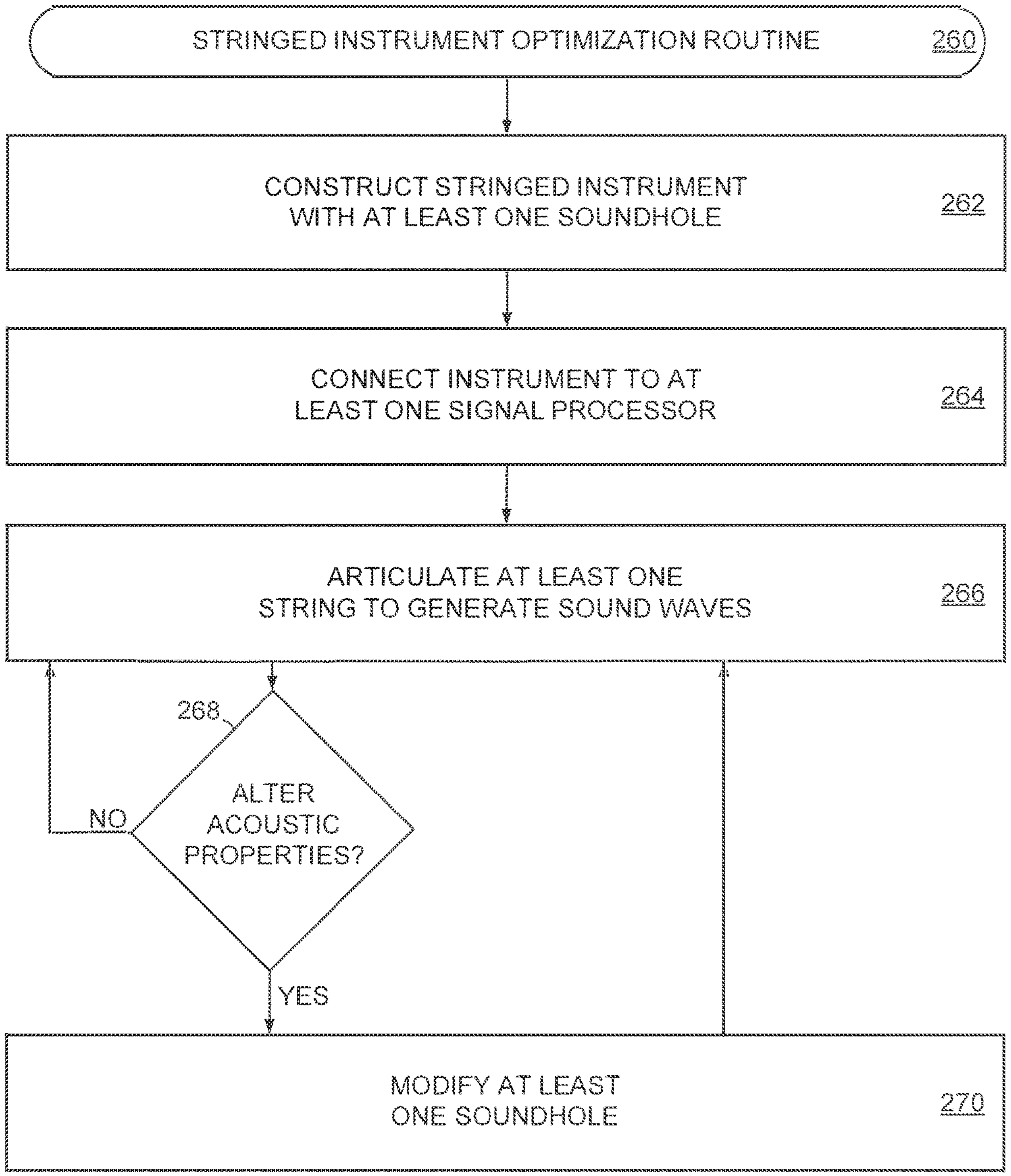
FIG. 7 shows an example resonance optimization routine that can be carried out with the assorted embodiments of FIGS. 1-6.

FIG. 7 is a flowchart of an example stringed instrument optimization routine 260 that can be executed with the various embodiments conveyed in FIGS. 1-6. Initially, a stringed instrument is constructed in step 262 with at least one soundhole. Step 262 may fabricate a hollow body electric/semi-acoustic guitar from a solid body by forming one or more chambers that are sealed by a top cover. A soundhole with a tuned acoustic profile (size, length, diameter, and sidewall shape) may be positioned anywhere on the body in step 262, but is supported by a suspension in some embodiments to be aligned with a neck, headstock, bridge, and strings, as shown in FIGS. 3A-3C.

Instrument construction in step 262 can involve factory tuning where technicians optimize the soundhole acoustic profile, perhaps by testing multiple different soundholes, for the as-constructed body. For instance, a fabricated instrument body may have slightly different internal chamber dimensions and volume that is accommodated in the factory by testing multiple different soundhole acoustic profiles in order to ensure acoustic phase reversal for a particular frequency, such as 147 Hz, or for a selected frequency range, such as 140-250 Hz. Once the resonance of the constructed body has been optimized, step 262 finalizes factory fabrication by installing and setting up the instrument for musical playback. That is, the instrument may not be in tune, but is complete and ready to produce sound and music.

In some embodiments, step 262 involves attaching electronics, such as pickup(s), circuit boards circuitry, knobs, and tuners, to the body to allow the instrument to be played via a separate signal processor. Such electronics can be a magnetic type that differs from piezo type electronics that respond to the vibration of strings found on acoustic-electric instruments. The inclusion of electronics allows step 264 to connect the stringed instrument to at least one signal processor, such as a pedal, amplifier, or pre-amplifier. Articulation of the strings in step 266 produces sound waves that are concurrently generated within the internal chamber of the instrument housing, received by the electronic pickup(s), and received by the internal chamber(s) via one or more soundholes.

The sound waves in step 266 are received, or generated, by the internal chamber(s) at a first acoustic phase that is reverberated within the chamber(s) before exiting the body via the same soundhole(s) at a phase inverse from the first acoustic phase. Hence, whatever acoustic phase initially entering the internal chamber will be out-of-phase with the acoustic phase of the exiting sound waves by 180 degrees. The combination of internal chamber volume and acoustic phase reversal modifies the resonance frequency of the instrument body while altering the acoustic properties of the sound waves resulting from the string vibrations. As a result, die stringed instrument will have an enhanced acoustic quality proximal the instrument while providing an electronically reproducible signal to the connected signal processors).

Music and other sounds can be continuously or sporadically played by a user via the instrument in step 266 for any amount of time. However, decision 268 can evaluate if the user would like to alter the acoustic properties of the instrument. If so, step 270 modifies at least one soundhole, such as by inserting an insert, installing a cover to seal a soundhole, or articulating a soundhole member to change the acoustic profile of the soundhole. If not, routine 200 returns to step 266 so that sound can continuously, or sporadically, be generated at will. Decision 268 and step 270 can be revisited any number of times to retune the instrument so that different frequencies, or frequency ranges, result in an acoustic phase reversal. As a result of step 270, a user can materially contribute to the tonality, acoustic quality, and resonance of the stringed instalment that can be appreciated whether or not the instrument is connected to an exterior signal processor.

Through the various embodiments of this disclosure a stringed instrument can be tuned to alter the acoustic properties than the instrument body. The use of one or more soundholes with a smooth radiused transition to the top cover of an instrument allows a relatively small internal body cavity to convey rich, deep, and pure tonality across a range of frequencies due to the resonance frequency of the instrument body being altered by the soundhole(s). The ability to change an existing soundhole via an insert with a different acoustic profile, such as length, sidewall shape, and diameter, allows a user to manipulate the acoustic performance of a stringed instrument at will.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed:

1. A musical instrument, comprising:

an instrument body including an internal cavity between a top cover and floor of the instrument body;

a sound hole body including an opening to function as a sound hole for the musical instrument with a first curvilinear transition region formed as a curved surface extending from the top cover into the internal cavity; and a suspension structure in contact with the sound hole body and further extending from the sound hole body to the instrument body to suspend the sound hole body above the floor of the instrument body, wherein the suspension structure includes, (a) a first rail including a first end coupled to the instrument body and a second distal end contacting the floor of the instrument body with a portion of the first rail contacting a first side of the sound hole, (b) a second rail including a first end coupled to the instrument body and a second distal end contacting the floor of the instrument body with a portion of the second rail contacting a second side of the sound hole opposite the first side of the sound hole, and (c) a bridge support coupled between the first rail and second rail and suspended between the floor of the instrument body and the top cover of the instrument body outside a footprint of the sound hole body.

2. The musical instrument of claim 1, wherein the internal cavity of the sound hole body includes a linear surface extending from the first curvilinear transition region.

3. The musical instrument of claim 2, wherein the internal cavity of the sound hole body further includes a second curvilinear transition region formed as a continuous curve disposed at a distal end of the linear surface.

4. The musical instrument of claim 1, wherein the sound hole produces an altered resonance frequency of the instrument body.

5. The musical instrument of claim 1, wherein a side surface of the instrument body includes a curvilinear surface between the floor and top cover.

6. The musical instrument of claim 1, wherein the top cover is disposed in a recess of the instrument body.

7. A musical instrument, comprising:

an instrument body including an internal cavity;

a sound hole body including an obstruction-free opening to function as a sound hole to produce an altered resonance frequency of the instrument body, wherein the obstruction-free opening extends as a curvilinear surface region extending in a continuous curve from a top cover of the instrument body into the internal cavity; and a suspension structure in contact with the sound hole body and extending to the instrument body to suspend the sound hole body above a floor of the instrument body, wherein the suspension structure includes, (a) a first rail extending from the instrument body to a floor of the instrument body with a portion of the first rail contacting the sound hole, and (b) a second rail extending from the instrument body to a floor of the instrument body with a portion of the second rail contacting the sound hole.

8. The musical instrument of claim 7, wherein the internal cavity of the sound hole body includes a linear surface extending from the first curvilinear transition region.

9. The musical instrument of claim 8, wherein the internal cavity of the sound hole body further includes a second curvilinear transition region formed as a continuous curve disposed at a distal end of the linear surface.

10. The musical instrument of claim 7, wherein the first rail includes a first end notched into the instrument body and a second distal end contacting the floor of the instrument body and the second rail includes a first end notched into the instrument body and a second distal end contacting the floor of the instrument body.

11. The musical instrument of claim 7, wherein the suspension further includes a bridge support coupled between the first rail and second rail and suspended between the floor of the instrument body and the top cover of the instrument body outside a footprint of the sound hole body.

12. The musical instrument of claim 7, wherein a side surface of the instrument body includes a curvilinear surface between the floor and top cover.

13. The musical instrument of claim 7, wherein the top cover is disposed in a recess of the instrument body.

14. A method of making a musical instrument, comprising:

providing an instrument body including an internal cavity between a top cover and floor;

disposing a sound hole body including an obstruction-free opening to function as a sound hole to produce an altered resonance frequency of the instrument body, wherein the obstruction-free opening extends as a curvilinear surface region extending in a continuous curve from a top cover of the instrument body into the internal cavity; and providing a suspension structure in contact with the sound hole body and further extending from the sound hole body to the instrument body to suspend the sound hole body above the floor of the instrument body, wherein providing the suspension structure includes, (a) providing a first rail extending from the instrument body to a floor of the instrument body with a portion of the first rail contacting the sound hole, and (b) providing a second rail extending from the instrument body to a floor of the instrument body with a portion of the second rail contacting the sound hole.

15. The musical instrument of claim 14, wherein the internal cavity of the sound hole body includes a linear surface extending from the first curvilinear transition region.

16. The method of claim 15, wherein the internal cavity of the sound hole body further includes a second curvilinear transition region formed as a continuous curve disposed at a distal end of the linear surface.

17. The method of claim 14, wherein providing the first rail includes notching a first end into the instrument body and a second distal end contacting the floor of the instrument body and providing the second rail includes notching a first end into the instrument body and a second distal end contacting the floor of the instrument body.

18. The method of claim 14, wherein providing the suspension further includes providing a bridge support coupled between the first rail and second rail and suspended between the floor of the instrument body and the top cover of the instrument body outside a footprint of the sound hole body.

19. The method of claim 14, wherein a side surface of the instrument body includes a curvilinear surface between the floor and top cover.

20. The method of claim 14, wherein the top cover is disposed in a recess of the instrument body.

* * * * *